Figure 1:
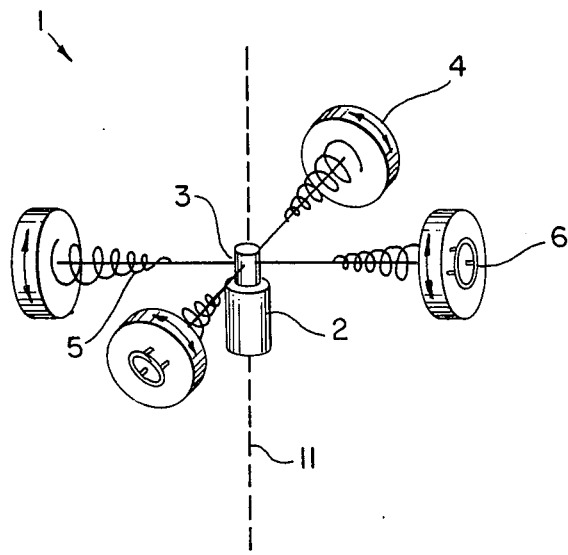

United States Patent [19]

Sen

[11] 4,078,748
[45] Mar. 14, 1978

[54] ATTITUDE STABILIZATION AND CONTROL OF DUAL-SPIN SPACECRAFT

[75] Inventor: Asim K. Sen, Ottawa, Canada

[73] Assignee: Synchrosat Limited, Ottawa, Canada

[21] Appl. No.: 557,605

[22] Filed: Mar. 12, 1975

[30] Foreign Application Priority Data

Mar. 18, 1974 Canada .................................. 195311

[51] Int. Cl.² ........................ B64G 1/00; G01C 19/02
[52] U.S. Cl. ...................................... 244/170; 74/55; 244/165
[58] Field of Search ............... 244/170, 164, 165, 167, 244/3.2, 3.21; 74/5.5

[56] References Cited

U.S. PATENT DOCUMENTS

| | | | |
|---|---|---|---|
| 3,424,401 | 1/1969 | Maurer | 244/165 |
| 3,471,105 | 10/1969 | Yarber et al. | 244/165 |
| 3,818,767 | 6/1974 | Donohue et al. | 244/165 |
| 3,877,662 | 4/1975 | Reiter et al. | 244/170 |

OTHER PUBLICATIONS

Sen, Asim K., "The Use of a Spinning Dissipator for Attitude Stabilization of Earth–Orbiting Satellites," IEEE Transactions of Aerospace and Electronic Systems, vol. Aes-9 No. 2 Mar. 1973, pp. 272 14 279.

Sen, Asim K., Addendum to "The Use of a Spinning Dissipator for Attitude Stabilization of Earth–Orbiting Satellites," IEEE Transactions on Aerospace and Electronic Systems, vol. Aes-10, No. 1, Jan. 1974, pp. 167-168.

*Primary Examiner*—Stephen G. Kunin

[57] ABSTRACT

This invention relates to an attitude stabilizing system for a rod-shaped satellite in which stabilization is achieved by use of a spinning energy dissipator. The system can operate by being mounted on the rotor of a dual spin satellite or by being connected to the main body of the satellite through a motor and bearing assembly. In the latter situation, the stabilizer acts both as a nutation damper and a momentum source and thereby eliminates the need for an additional rotor element to provide the spacecraft momentum. The spinning energy dissipator may be designed to use four identical wheels mounted coaxially with and at the ends of the arms of a cruciform structure. The structure may then be spun about the axis perpendicular to the arms, to provide angular momentum along the spacecraft spin axis. In the event of any spacecraft nutation, the wheels experience the torques produced by inertial forces. The necessary damping and restoring (spring) torques are provided by means of a torsional arrangement built around the center of each wheel. In order to provide damping at lower threshold of spacecraft nutations, the dissipator wheels may also include viscous ring dampers mounted on or around each wheel.

7 Claims, 3 Drawing Figures

ATTITUDE STABILIZATION AND CONTROL OF DUAL-SPIN SPACECRAFT

This invention relates to an attitude stabilizer for a rod-shaped satellite in which stabilization is achieved by use of a spinning energy dissipator.

The spinning stabilizer can operate by being mounted on the rotor of a dual spin satellite or by being connected to the main body of the satellite by a motor and bearing assembly. In either case the rotor or the spinning dissipator must have a favorable inertia ratio to act as an attitude stabilizer.

From a practical standpoint, an obvious limitation of the existing system using energy dissipator for attitude stabilization is that its response time is slow. This means that, in such satellites, an initial nutation usually takes a long time to decay to its minimum acceptable level. Also, in some situations, the initial nutation may never settle to its minimum acceptable value, thus resulting in poor accuracy of the mission. It is believed that the deficiency in this system results from the fact that, in these satellite designs, attitude stabilization is achieved by means of an energy dissipator which must be located on the despun or the slowly-spinning part of the satellite. Consequently, the effectiveness of the dissipator becomes severely restricted. It is also believed that the overall efficiency of the dissipator is further reduced because the dissipator will also have to work against the destabilizing forces which might originate from rotor dissipations.

The preceding problems in the systems in use can be reduced by appropriate design changes. One design change is achieved by use of an energy dissipator which is located on the rotor or the spinning part of the satellite to obtain attitude stabilization. The overall efficiency of this new dissipator can be increased to any desired extent without affecting the size and weight of its original design, simply by increasing the spin rate of the rotor element. However, the only requirement for the improved dissipator to work as an attitude stabilizer is that the spinning part of the satellite containing the energy dissipator must have a favourable inertia ratio.

A second embodiment involves using no rotor, the dissipator itself is spun to provide both nutation damping and angular momentum to the spacecraft by using an appropriate motor and bearing assembly to connect the dissipator to the satellite.

Of the two typical embodiments mentioned, the design of the former follows closely that of existing satellite systems, except that the dissipator unit which is now of a completely different design is mounted on the rotor element and not on the despun antenna part of satellite. In the second embodiment, on the other hand, the main body (despun) of the spacecraft consists of a central part which houses the on-board electronics and the control systems, the antenna and the solar panel structures being attached to its sides; the dissipator is connected to the despun part through a despin mechanism comprised of a motor and bearing assembly.

In both embodiments, the dissipator consists of four identical wheels (non-spinning, oscillating) mounted coaxially with and at the ends of the arms of a cruciform structure. In the first embodiment, the dissipator is mounted directly on the rotor element whereas the cruciform structure in the second embodiment on which the dissipator wheels are mounted is attached to the satellite main body through an appropriate motor and bearing assembly (FIG. 3) so that it can be spun freely about the axis perpendicular to the arms of the cruciform structure to provide angular momentum along the spacecraft spin axis.

In the event any spacecraft nutation occurs, each dissipator wheel (non-spinning, oscillating) will experience torques produced by the inertial forces and, because of the constraint used, will oscillate only in the plane parallel to the spacecraft spin axis. The necessary damping and restoring (spring) torques are then provided by means of a torsional system built around the center of each wheel. In an actual design, the damping may be provided by allowing the dissipator wheel to oscillate either in an eddy-current field or in a viscous fluid. To provide redundancy and also to avoid any possible threshold of the dissipator performance, the design may be augmented with an additional Viscous Ring Damper. As is commonly used in this art, the working fluid in the viscous ring damper may include mercury or any other suitable viscous liquid. It might be important to point out here that the result that a passive dissipator such as the four-wheel or the viscous ring configuration can provide a more effective stabilization of the satellite attitude when placed on the spinning part of a rod-shaped dual-spin satellite rather than on the despun part, was not previously known in this art or, at least, the applicant is not presently aware of any such claims in the prior art.

IN THE DRAWINGS

FIG. 1 Spinning Dissipator

Figure 2:
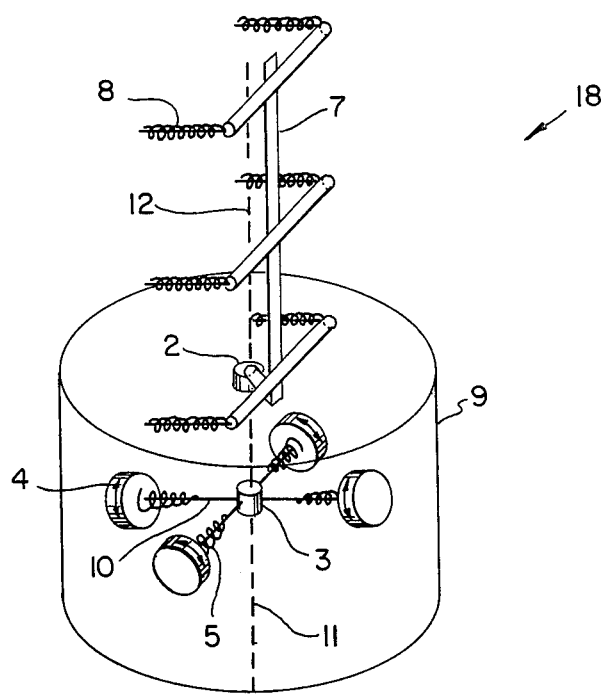

FIG. 2 Spinning Dissipator connected to the spin part of a dual spin satellite.

Figure 3:
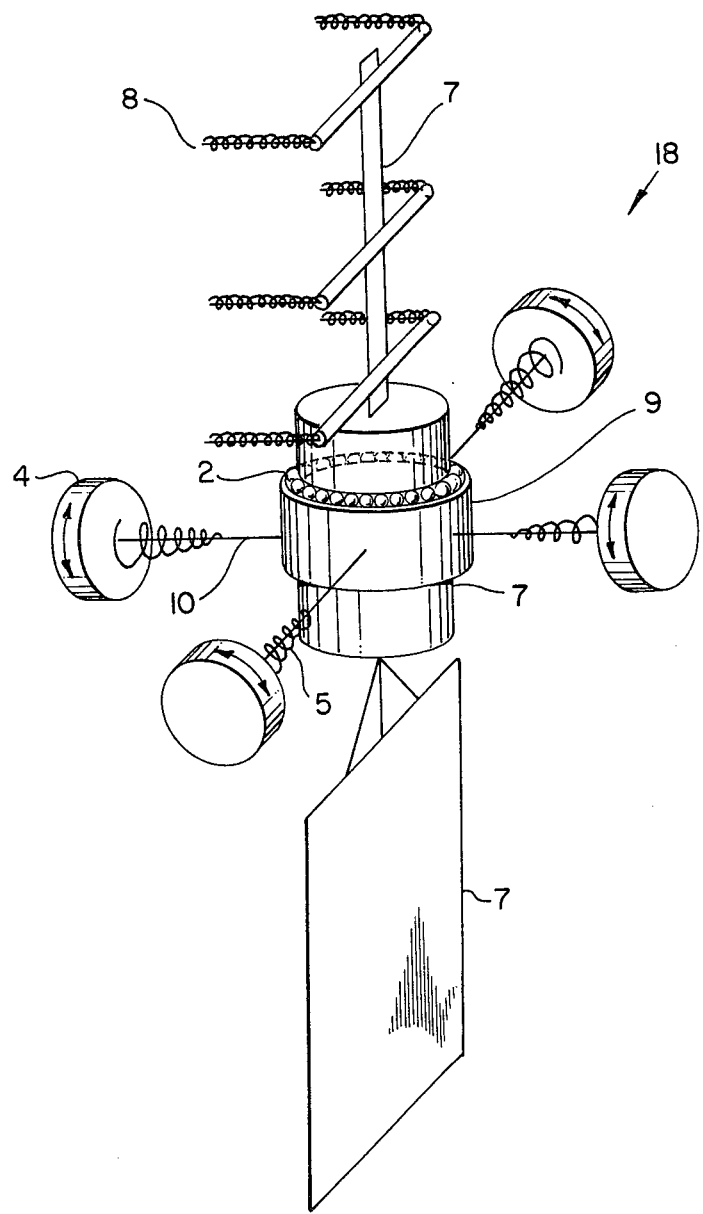

FIG. 3 Spinning Dissipator forming the spin part of a Dual Spin Satellite.

Referring to FIG. 1 there is shown a spinning dissipator 1 comprised of a motor and bearing assembly 2, a cruciform structure with a central axle 3, oscillating wheels 4, dissipator springs 5 and viscous ring damper 6. The cruciform structure with the central axle 3 is adapted to be connected to the satellite by the motor and bearing assembly 2. The motor and bearing assembly is adapted to spin the dissipator about the axis perpendicular to the cruciform structure 3. The dissipator wheels 4 are coaxially mounted and identical. The oscillating wheels 4 may include viscous ring dampers 6 which are mounted on or around the wheels to provide damping at lower threshold of spacecraft nutations.

In FIG. 2 the dual spin satellite 18 is comprised of a despun part 7 which contains a massive antenna structure 8 and a spinning part 9 which houses the control and power systems as well as the on-board electronics. The despun part 7 and the spinning part 9 are connected by a despin mechanism comprised of a motor and bearing assembly 2. As seen in FIG. 2, the spinning dissipator is comprised of a series of identical oscillating wheels 4 mounted on co-axial rods 10 of cruciform structure 3, equidistant from the axis 11 which is normally coincident with the central axis of the spinning part 9. Torsional dissipator springs 5 are fastened to the oscillating wheels 4 to provide restoring torques. The oscillating wheels 4 are disposed in either eddy-current field or viscous fluid (not shown) as is well-known in this art to provide damping torques. As seen in FIG. 2, the spinning dissipator is connected directly to the spinning part 9.

As seen in FIG. 3, the spinning dissipator forms the spinning part 9. The despun part 7 is comprised of the antenna, solar panel, control and power systems as well as the on-board electronics. The spinning part 9 comprised of the spinning dissipator 1 is connected to the despun part 7 by motor and bearing assembly 2.

I claim:

1. A spinning dissipator for a rod-shaped dual-spin earth orbiting satellite comprised of a motor and bearing assembly, a cruciform structure with a central axle, identical oscillating wheels, and a damping and restoring mechanism, the central axle is adapted to be connected through the motor and bearing assembly to the satellite main body substantially in alignment with the satellite axis of least inertia, the arms of the cruciform structure being perpendicularly equally disposed about the central axle from one point thereon, the identical oscillating wheels co-axially being disposed on each arm end of the cruciform structure, and torsional damping and restoring means for each oscillating wheel.

2. The spinning dissipator for a dual-spin earth orbiting satellite of claim 1 wherein the central axle of the spinning dissipator is connected directly to the spinning part of the satellite.

3. The spinning dissipator for a dual-spin earth orbiting satellite of claim 1 wherein the spinning dissipator is the spinning part of the dual-spin satellite and the central axle is connected to the satellite main body through the motor and bearing assembly.

4. The spinning dissipator for a dual-spin earth orbiting satellite of claim 1 wherein there are two oscillating wheels disposed diametrically opposite to each other.

5. The spinning dissipator for a dual-spin earth orbiting satellite of claim 1 wherein there are four oscillating wheels, one on each arm of the cruciform structure.

6. The spinning dissipator for a dual-spin earth orbiting satellite of claim 1 wherein the oscillating wheels have mounted thereon toroidal rings completely filled with viscous fluid.

7. The spinning dissipator for a dual-spin earth orbiting satellite of claim 1 wherein the oscillating wheels have mounted thereabout toroidal rings completely filled with viscous fluid.

* * * * *